Patented Sept. 30, 1930

1,776,801

UNITED STATES PATENT OFFICE

JAMES BADDILEY, PERCY CHORLEY, AND RAINALD BRIGHTMAN, OF BLACKLEY, MANCHESTER, ENGLAND, ASSIGNORS TO BRITISH DYESTUFFS CORPORATION LIMITED, OF BLACKLEY, MANCHESTER, ENGLAND

NEW PRIMARY DISAZO DYESTUFFS

No Drawing. Application filed April 19, 1928, Serial No. 271,399, and in Great Britain April 28, 1927.

According to this invention we obtain new and valuable disazo dyestuffs by combining meta mononitro-benzidine or m-m'-dinitro-benzidine having the respective formulæ

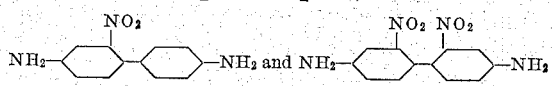

with one molecule of an amino naphthol sulphonic acid or an N-substituted derivative thereof and one molecule of any of the usual coupling components. These new dyestuffs may be represented by the following probable general formula

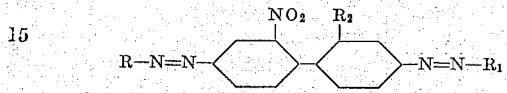

wherein $R_2$ represents hydrogen or a nitro group and R and $R_1$ represent coupling components, one of which is an amino naphthol sulphonic acid. Many of the dyestuffs we obtain possess the valuable property of dyeing artificial silk, that is a regenerated cellulose such as viscose silk, in even shades. Certain of the dyestuffs we obtain give dyeings on wool which are fast to milling. Particularly valuable products are obtained when the tetrazo compound is combined with one molecule of 2-amino-8-naphthol-6-sulphonic acid or an N-substituted derivative thereof; that is a 2-amino-8-naphthol-6-sulphonic acid of the general type

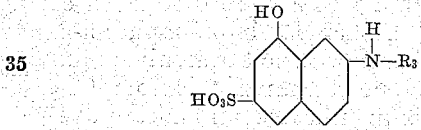

The amino naphthol sulphonic acid may be combined either in acid or in alkaline solution, and it may be combined before or after combination with the other coupling component.

The present invention relates to a broad class of dyes. There are hereinafter given many specific examples showing the various coupling components that are typical illustrations, which may be coupled with the tetrazotized meta nitrated benzidine compound. By the choice of the specific coupling component and the manner of coupling dyes of various shades may be prepared. The present invention is susceptible of considerable modification without exceeding the broad scope as indicated above.

The following examples illustrate the invention without limiting it, parts being by weight:

*Example 1.*—229 parts of meta mononitrobenzidine are tetrazotized with 138 parts of sodium nitrite in the usual way and the suspension of tetrazo compound is stirred into a cold solution of 138 parts of salicylic acid in 40 parts of sodium hydroxide containing 400 parts of sodium carbonate. The mixture is cooled with ice and stirred until coupling is complete, when a solution of 239 parts of 1-amino-8-naphthol-4-sulphonic acid in 40 parts of sodium hydroxide is added. The mixture is stirred and maintained alkaline until coupling is complete, when it is heated up and the dyestuff isolated by the addition of common salt. It dyes viscose silk in even violet-brown shades and wool a brownish-violet shade, fast to milling.

*Example 2.*—The suspension of tetrazo compound obtained by treating 229 parts of meta mononitrobenzidine with 138 parts of sodium nitrite and 500 parts of 36% hydrochloric acid is stirred into a solution of 138 parts of salicylic acid in 40 parts of sodium hydroxide containing 400 parts of sodium carbonate. Stirring is continued until coupling is complete when the mixture is made acid by means of acetic acid and a neutral solution containing 239 parts of 2-amino-8-naphthol-6-sulphonic acid is stirred in. After stirring the acid mixture until combination is complete, the mixture is made alkaline, heated up and the dyestuff isolated by the addition of common salt. It dyes viscose silk and wool in red shades.

*Example 3.*—229 parts of meta mononitrobenzidine are tetrazotized with 138 parts of sodium nitrite in the usual way and to the suspension of tetrazo compound there is added a neutral solution of 323 parts of 1:2′:5′-dichloro-4′-sulphophenyl-3-methyl-5-pyrazolone. The mixture is stirred until coupling is complete, when it is rendered alkaline by the addition of sodium carbonate and a neutral solution of 2-amino-8-naphthol-6-sulphonic acid is stirred in. Stirring is continued until coupling is complete, when the mixture is heated up and the dyestuff isolated by the addition of common salt. It dyes viscose silk a yellow-brown shade and wool in yellowish-brown shades fast to milling. A dyestuff giving somewhat redder shades is obtained by adding to the suspension of tetrazo compound, first the neutral solution of 2-amino-8-naphthol-6-sulphonic acid and about 250 parts of sodium acetate crystals, and then a neutral solution of 254 parts of 1-para-sulphophenyl-3-methyl-5-pyrazolone and stirring until coupling is complete, after which the mixture is made alkaline and the dyestuff isolated in the usual way.

*Example 4.*—229 parts of meta mononitrobenzidine are tetrazotized with 138 parts of sodium nitrite in the usual way and to the suspension of tetrazo compound there is added a neutral solution of 245 parts of sodium naphthionate. Alkali is added to remove most of the acidity and the faintly acid mixture is stirred until coupling is complete. The mixture is then made alkaline with sodium carbonate and a neutral solution of 337 parts of the sodium salt of 2-phenyl-amino-8-naphthol-6-sulphonic acid is added. After stirring until coupling is complete, the mixture is heated up and the dyestuff isolated by the addition of common salt. It dyes viscose a maroon shade and wool a copper-brown shade.

*Example 5.*—229 parts of meta mononitrobenzidine are tetrazotized in the usual way with 138 parts of sodium nitrite, and the suspension of tetrazo compound is stirred into a solution of 239 parts of 2-amino-8-naphthol-6-sulphonic acid, containing 350 parts of soda ash. The mixture is stirred until coupling is complete, when a solution of 110 parts of resorcinol is added. The mixture is maintained alkaline and stirred until coupling is complete, when it is heated up and the dyestuff isolated by the addition of common salt. It dyes viscose silk in violet-brown shades and wool in violet-brown shades.

A dyestuff affording very similar shades is obtained by using a solution of 108 parts of metaphenylenediamine in place of the solution of resorcinol used in the above example. If in place of a solution of metaphenylenediamine or resorcinol in the above example, there is added a neutral solution of 224 parts of 1-naphthol-4-sulphonic acid, the coupling medium being alkaline throughout, we obtain a dyestuff dyeing viscose silk a brownish-violet and wool a dull violet shade. Similarly, by adding a neutral solution containing a further 239 parts of 2-amino-8-naphthol-6-sulphonic acid, in place of the 1-naphthol-4-sulphonic acid, there is obtained a dyestuff dyeing viscose silk a claret shade and wool a reddish-brown shade.

*Example 6.*—274 parts of 2:2′-dinitrobenzidine are dissolved in water with 500 parts of 36% hydrochloric acid and tetrazotized by treating with 138 parts of sodium nitrite. The suspension of yellow-brown tetrazo compound is stirred into a solution containing 138 parts of salicylic acid and 500 parts of sodium carbonate. After stirring about an hour a neutral solution containing 239 parts of 2-amino-8-naphthol-6-sulphonic acid is added. Stirring is continued until combination is completed when the mixture is heated up and the dyestuff is isolated by the addition of common salt. It dyes viscose silk a yellowish-brown shade.

*Example 7.*—229 parts of meta-mononitrobenzidine are tetrazotized and combined in alkaline medium with 138 parts of salicylic acid as described in Example 1. After this coupling is completed a neutral solution of 239 parts of 2-amino-8-naphthol-6-sulphonic acid is added and the alkaline mixture is stirred until coupling is complete. The mixture is then heated up and the dyestuff isolated by addition of salt. When dry it forms a grey-black powder dissolving in water to a red-brown solution which is not changed on addition of alkalies but deposits a red precipitate on addition of mineral acid. The powder dissolved in strong sulphuric acid to a crimson solution which deposits a red-brown precipitate on dilution. The dyestuff dyes viscose silk a reddish-brown shade.

*Example 8.*—229 parts of meta-mononitrobenzidine are tetrazotized and combined in alkaline medium with 138 parts of salicylic acid as described in Example 1. After this coupling is completed a neutral solution of 315 parts of 2-phenylamino-8-naphthol-6-sulphonic acid is added and the alkaline mixture is stirred until coupling is complete. The mixture is then heated up and the dyestuff isolated by addition of salts. When dry it forms a grey-black powder dissolving in water to a dark brown solution which becomes redder on addition of caustic soda and deposits a brown precipitate on addition of mineral acids. The powder dissolves in strong sulphuric acid to a crimson solution which deposits a red-brown precipitate on dilution. The dyestuff dyes viscose silk a brown shade.

Our invention is further illustrated by the examples quoted in the following table, in which the diazo component in each case is tetrazotized 2-nitrobenzidine:

| First coupling component | Second coupling component (coupled alkaline unless otherwise stated) | Shade on viscose silk |
| --- | --- | --- |
| Salicylic acid | 2 - phenylamino - 5 - naphthol - 7 - sulphonic acid | Red |
| Do | 5 - hydroxy - 2 - naphthylglycine - 7 - sulphonic acid | Yellowish-red |
| Do | 2 - benzoylamino - 8 - naphthol - 6 - sulphonic acid | Scarlet |
| Do | 8 - hydroxy - 2 - naphthylglycine - 6 - sulphonic acid | Brown |
| Do | 2 - ethylamino - 8 - naphthol - 6 - sulphonic acid | Brown |
| Do | 2 - 2' : 4' - dinitrophenylamino - 8 - naphthol - 6 - sulphonic acid | Reddish-brown |
| Do | 2 - (4' - chlorophenylamino) - 8 - naphthol - 6 - sulphonic acid | Brown |
| o-cresotinic acid | 2 - m - xylylamino - 8 - naphthol - 6 - sulphonic acid | Brown |
| Beta - oxynaphthoic acid | 2 - amino - 8 - naphthol - 6 - sulphonic acid | Reddish-violet |
| Salicylic acid | 2 - m - xylylamino - 8 - naphthol - 6 - sulphonic acid | Brown |
| o-cresotinic acid | 2 - phenylamino - 8 - naphthol - 6 - sulphonic acid | Brown |
| p-cresotinic acid | 2 - phenylamino - 8 - naphthol - 6 - sulphonic acid | Brown |
| o-cresotinic acid | 2 - amino - 8 - naphthol - 6 - sulphonic acid | Yellowish-brown |
| p-cresotinic acid | 2 - amino - 8 - naphthol - 6 - sulphonic acid | Yellowish-brown |
| 1 - phenyl - 3 - methyl - 5 - pyrazolone | 2 - amino - 8 - naphthol - 6 - sulphonic acid | Bluish-brown |
| 1 - phenyl - 3 - methyl - 5 - pyrazolone | 2 - amino - 8 - naphthol - 6 - sulphonic acid (acid coupled) | Crimson |

The 2-(4'-chlorophenylamino)-8-naphthol-6-sulphonic acid used as a coupling component in some of the above examples may be made by condensing p-chloroaniline with 2-amino-8-naphthol-6-sulphonic acid in the presence of bisulphite by the well known Bucherer reaction.

What we claim and desire to secure by Letters Patent is:

1. New primary disazo dyes obtained by tetrazotizing meta nitrated benzidine and coupling the tetrazo compound with one molecular proportion of any coupling component and with one molecular proportion of an aminonaphthol sulphonic acid, the products being brown to black powders, which dissolve in water giving red-brown to violet-brown solutions and yield crimson-red to dull violet or violet-brown solutions in sulphuric acid, dyeing viscose silk in shades varying from yellowish-brown and red to violet-brown.

2. New primary disazo dyes obtained by tetrazotizing a meta nitrated benzidine and coupling the tetrazo compound with one molecular proportion of any coupling component and with one molecular proportion of an aminonaphtholsulphonic acid of the formula

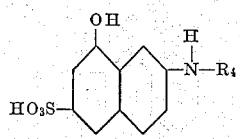

in which hydrogen and aryl groups are both represented by $R_4$, the products being brown to black powders, which dissolve in water giving red-brown to violet-brown solutions and yield crimson-red to dull violet or violet-brown solutions in sulphuric acid, dyeing viscose silk in shades varying from yellowish-brown and red to violet-brown.

3. New primary disazo dyes obtained by tetrazotizing a meta nitrated benzidine and coupling the tetrazo compound with one molecular proportion of an ortho hydroxy-carboxylic acid of the benzene series and with one molecular of an aminonaphtholsulphonic acid of the formula

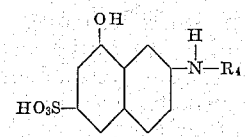

in which hydrogen and aryl groups are both represented by $R_4$, the products being brown to black powders, which dissolve in water giving red-brown to violet-brown solutions and yield crimson-red to dull violet or violet-brown solutions in sulphuric acid, dyeing viscose silk in shades varying from yellowish-brown and red to violet-brown.

4. As new dyes the disazo dyes having the probable general formula

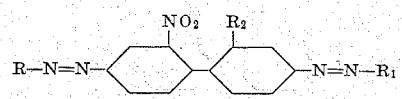

wherein $R_2$ represents hydrogen or a nitro group and $R$ and $R_1$ represent coupling components, one of which is an amino naphthol sulphonic acid, the said dyes being soluble in water and in sulphuric acid and dyeing wool and viscose silk in level shades, the said dyes being obtainable by coupling a tetrazotized meta nitrated benzidine with one molecular proportion of a coupling component and one molecular proportion of an amino naphthol sulphonic acid.

5. As new dyes the disazo dyes having the probable general formula

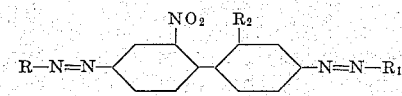

wherein $R_2$ represents hydrogen or a nitro group and $R$ and $R_1$ represent coupling components, one of which is an amino naphthol sulphonic acid of the type

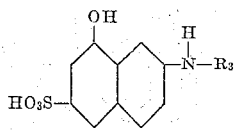

wherein $R_3$ represents hydrogen, alkyl, acyl or aryl groups, the said dyes being soluble in water and sulphuric acid and dyeing wool and viscose silk in level shades, the said dyes being obtainable by coupling a tetrazotized meta nitrated benzidine with one molecular proportion of a coupling component and one molecular proportion of the said amino naphthol sulphonic acid.

6. As new dyes the disazo dyes having the probable general formula

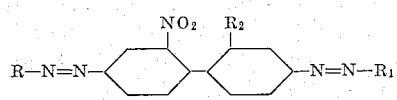

wherein $R_2$ represents hydrogen or a nitro group and R and $R_1$ represent coupling components, one coupling component being an ortho hydroxycarboxylic acid of the benzene series and the other coupling component being an amino naphthol sulphonic acid, the said dyes being soluble in water and in sulphuric acid and dyeing wool and viscose silk in level shades, the said dyes being obtainable by coupling a tetrazotized meta nitrated benzidine with one molecular proportion of said ortho hydroxycarboxylic acid and one molecular proportion of said amino naphthol sulphonic acid.

7. As new dyes the disazo dyes having the probable general formula

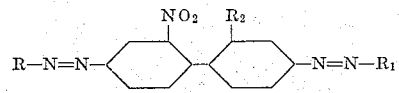

wherein $R_2$ represents hydrogen or a nitro group and R and $R_1$ represent coupling components, one coupling component being an ortho hydroxycarboxylic acid of the other benzene series and the coupling component being an amino naphthol sulphonic acid of the type

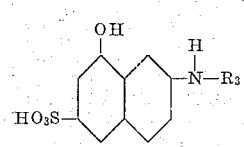

wherein $R_3$ represents hydrogen, alkyl, acyl or aryl groups, the said dyes being soluble in water and in sulphuric acid and dyeing wool and viscose silk in level shades, the said dyes being obtainable by coupling a tetrazotized meta nitrated benzidine with one molecular proportion of said ortho hydroxycarboxylic acid and with one molecular proportion of the said amino naphthol sulphonic acid.

8. As new dyes the disazo dyes having the probable general formula

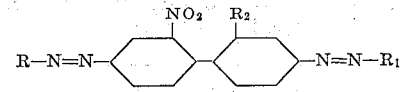

wherein $R_2$ represents hydrogen or a nitro group and R and $R_1$ represent coupling components, one coupling component being salicyclic acid and the other coupling component being an amino naphthol sulphonic acid, the said dyes being soluble in water and in sulphuric acid and dyeing wool and viscose silk in level shades, the said dyes being obtainable by coupling a tetrazotized meta nitrated benzidine with one molecular proportion of said salicylic acid and one molecular proportion of the said amino naphthol sulphonic acid.

9. As new dyes the disazo dyes having the probable general formula

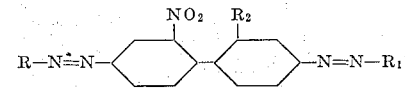

wherein $R_2$ represents hydrogen or a nitro group and R and $R_1$ represent coupling components, one coupling component being salicylic acid and the other coupling component being an amino naphthol sulphonic acid of the type

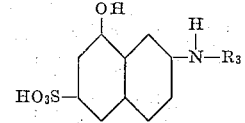

wherein $R_3$ represents hydrogen, alkyl, acyl or aryl groups, the said dyes being soluble in water and in sulphuric acid and dyeing wool and viscose silk in level shades, the said dyes being obtainable by coupling a tetrazotized meta nitrated benzidine with one molecular proportion of said salicylic acid and one molecular proportion of the said amino naphthol sulphonic acid.

10. As new dyes the disazo dyes having the probable general formula

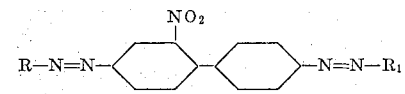

wherein R and $R_1$ represent coupling components, one of which is an amino naphthol sulphonic acid, the said dyes being soluble in water and in sulphuric acid and dyeing wool and viscose silk in level shades, the said dyes being obtainable by coupling a tetrazotized meta mono nitrated benzidine with one molecular proportion of a coupling component and one molecular proportion of an amino naphthol sulphonic acid.

11. As new dyes the disazo dyes having the probable general formula

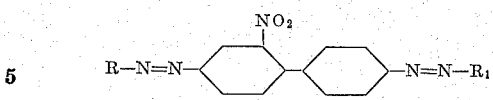

wherein R and $R_1$ represent coupling components, one of which is an amino naphthol sulphonic acid of the type

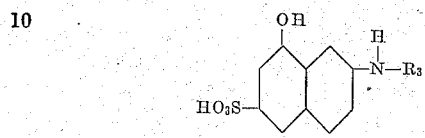

wherein $R_3$ represents hydrogen, alkyl, acyl or aryl groups, the said dyes being soluble in water and in sulphuric acid and dyeing wool and viscose silk in level shades, the said dyes being obtainable by coupling a tetrazotized meta mono nitrated benzidine with one molecular proportion of a coupling component and one molecular proportion of the said amino naphthol sulphonic acid.

12. As new dyes the disazo dyes having the probable general formula

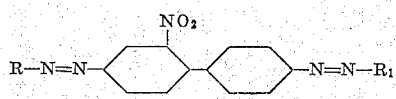

wherein R and $R_1$ represent coupling components, one coupling component being an ortho hydroxycarboxylic acid of the benzene series and the other coupling component being an amino naphthol sulphonic acid, the said dyes being soluble in water and in sulphuric acid and dyeing wool and viscose silk in level shades, the said dyes being obtainable by coupling a tetrazotized meta mono nitrated benzidine with one molecular proportion of said ortho hydroxycarboxylic acid and one molecular proportion of said amino naphthol sulphonic acid.

13. As new dyes the disazo dyes having the probable general formula

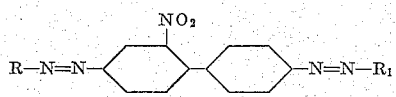

wherein R and $R_1$ represent coupling components, one coupling component being an ortho hydroxycarboxylic acid of the other benzene series and the coupling component being an amino naphthol sulphonic acid of the type

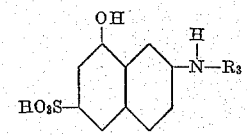

wherein $R_3$ represents hydrogen, alkyl, acyl or aryl groups, the said dyes being soluble in water and in sulphuric acid and dyeing wool and viscose silk in level shades, the said dyes being obtainable by coupling a tetrazotized meta mono nitrated benzidine with one molecular proportion of said ortho hydroxycarboxylic acid and with one molecular proportion of the said amino naphthol sulphonic acid.

14. As new dyes the disazo dyes having the probable general formula

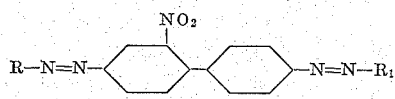

wherein R and $R_1$ represent coupling components, one coupling component being salicylic acid and the other coupling component being an amino naphthol sulphonic acid, the said dyes being soluble in water and in sulphuric acid and dyeing wool and viscose silk in level shades, the said dyes being obtainable by coupling a tetrazotized meta mono nitrated benzidine with one molecular proportion of said salicylic acid and one molecular proportion of the said amino naphthol sulphonic acid.

15. As new dyes the disazo dyes having the probable general formula

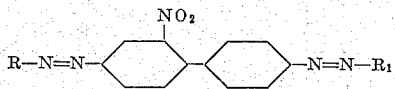

wherein R and $R_1$ represent coupling components, one coupling component being salicylic acid and the other coupling component being an amino naphthol sulphonic acid of the type

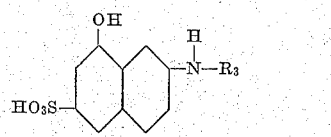

wherein $R_3$ represents hydrogen, alkyl, acyl or aryl groups, the said dyes being soluble in water and in sulphuric acid and dyeing wool and viscose silk in level shades, the said dyes being obtainable by coupling a tetrazotized meta mono nitrated benzidine with one molecular proportion of said salicylic acid and one molecular proportion of the said amino naphthol sulphonic acid.

In testimony whereof we affix our signatures.

JAMES BADDILEY.
PERCY CHORLEY.
RAINALD BRIGHTMAN.